United States Patent
Saha et al.

(10) Patent No.: US 10,956,310 B2
(45) Date of Patent: Mar. 23, 2021

(54) AUTOMATED TEST CASE GENERATION FOR DEEP NEURAL NETWORKS AND OTHER MODEL-BASED ARTIFICIAL INTELLIGENCE SYSTEMS

(71) Applicant: International Business Machines Corporation, Armonk, NY (US)

(72) Inventors: Diptikalyan Saha, Bangalore (IN); Aniya Aggarwal, New Delhi (IN); Pranay Lohia, Bangalore (IN); Kuntal Dey, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 16/117,903

(22) Filed: Aug. 30, 2018

(65) Prior Publication Data
US 2020/0073788 A1    Mar. 5, 2020

(51) Int. Cl.
*G06F 11/36* (2006.01)
*G06N 3/04* (2006.01)
*G06N 3/08* (2006.01)

(52) U.S. Cl.
CPC ...... *G06F 11/3684* (2013.01); *G06F 11/3688* (2013.01); *G06F 11/3692* (2013.01); *G06N 3/04* (2013.01); *G06N 3/08* (2013.01)

(58) Field of Classification Search
CPC ............... G06F 11/3684; G06F 11/368; G06F 11/3688; G06F 11/3692; G06N 3/04; G06N 3/08
(Continued)

(56) References Cited

U.S. PATENT DOCUMENTS 10,824,959 B1 * 11/2020 Chatterjee .............. G06N 20/00
2012/0265566 A1    10/2012 Kern
(Continued)

FOREIGN PATENT DOCUMENTS

CN    108304324 A    7/2018

OTHER PUBLICATIONS

Wikipedia "decision tree" web page from date Aug. 28, 2018, retrieved using the way back machine from https://web.archive.org/web/20180828112634/https://en.wikipedia.org/wiki/Decision_tree (Year: 2018).*

(Continued)

*Primary Examiner* — Yair Leibovich
(74) *Attorney, Agent, or Firm* — Ryan, Mason & Lewis, LLP

(57) ABSTRACT

Methods, systems and computer program products for automated test case generation are provided herein. A computer-implemented method includes selecting sample input data as a test case for a system under test, executing the test case on the system under test to obtain a result, and applying the result to a local explainer function to obtain at least a portion of a corresponding decision tree. The method further includes determining at least one path constraint from the decision tree, solving the path constraint to obtain a solution, and generating at least one other test case for the system under test based at least in part on the solution of the path constraint. The steps of the method are illustratively repeated in each of one or more additional iterations until at least one designated stopping criterion is met. The resulting test cases form a test suite for testing of a deep neural network (DNN) or other system.

18 Claims, 8 Drawing Sheets

(58) Field of Classification Search
USPC .................................................. 714/38.1
See application file for complete search history.

(56) References Cited

U.S. PATENT DOCUMENTS

| | | | | |
|---|---|---|---|---|
| 2015/0286470 | A1* | 10/2015 | Dahan | G06F 11/30 |
| | | | | 717/127 |
| 2015/0339213 | A1* | 11/2015 | Lee | G06F 3/0484 |
| | | | | 717/125 |
| 2016/0055426 | A1 | 2/2016 | Aminzadeh et al. | |
| 2016/0080243 | A1* | 3/2016 | Kodama | H04L 43/0888 |
| | | | | 370/252 |
| 2016/0085665 | A1 | 3/2016 | Junker et al. | |
| 2016/0335555 | A1* | 11/2016 | Llanes-Tosar | G06F 17/16 |
| 2018/0232523 | A1 | 8/2018 | Copty et al. | |
| 2019/0171553 | A1* | 6/2019 | Chauhan | G06N 5/022 |

OTHER PUBLICATIONS

Wikipedia "supervised learning" web page from date Aug. 25, 2018, retrieved using the way back machine, from https://web.archive.org/web/20180825103053/https://en.wikipedia.org/wiki/Supervised_learning (Year: 2018).*

CPC classification schedule of Jan. 9, 2017 (pp. 1 and 23), retrieved from https://www.cooperativepatentclassification.org/index.html (Year: 2017).*

M.W. Craven et al., "Extracting Tree-Structured Representations of Trained Networks," Proceedings of the 8th International Conference on Neural Information Processing Systems (NIPS), Nov. 27-Dec. 2, 1995, pp. 24-30.

M.T. Ribeiro et al., "Why Should I Trust You? Explaining the Predictions of Any Classifier," Proceedings of the 22nd ACM SIGKDD International Conference on Knowledge Discovery and Data Mining (KDD), Aug. 13-17, 2016, pp. 1135-1144.

S. Shaikh et al., "An End-to-End Machine Learning Pipeline that Ensures Fairness Policies," Data for Good Exchange Conference, arXiv:1710.06876v1, Oct. 18, 2017, 5 pages.

J. Adebayo et al., "Iterative Orthogonal Feature Projection for Diagnosing Bias in Black-Box Models," Proceedings of the 32nd International Conference on Machine Learning, arXiv:1611.04967v1, Nov. 15, 2016, 5 pages.

Y. Sun et al., "Testing Deep Neural Networks," arXiv:1803.04792v3, Mar. 18, 2018, 25 pages.

D. Gopinath et al., "Symbolic Execution for Deep Neural Networks," arXiv:1807.10439v1, Jul. 27, 2018, 9 pages.

Y. Sun et al., "Concolic Testing for Deep Neural Networks," arXiv:1805.00089v2, Aug. 4, 2018, 26 pages.

D. Gopinath et al., "DeepSafe: A Data-Driven Approach for Checking Adversarial Robustness in Neural Networks," arXiv:1710.00486v1, Oct. 2, 2017, 17 pages.

K. Pei et al., "DeepXplore: Automated Whitebox Testing of Deep Learning Systems," Proceedings of the 26th Symposium on Operating Systems Principles (SOSP), Oct. 28, 2017, 18 pages.

Y. Tian et al., "DeepTest: Automated Testing of Deep-Neural-Network-Driven Autonomous Cars," Proceedings of the 40th International Conference on Software Engineering (ICSE), May 27-Jun. 3, 2018, pp. 303-314.

R. Segala, "Quiescence, Fairness, Testing, and the Notion of Implementation," Information and Computation, Nov. 1997, pp. 194-210, vol. 138, No. 2.

A. Falk et al., "Testing Theories of Fairness—Intentions Matter," Games and Economic Behavior, Jan. 2008, pp. 287-303, vol. 62, No. 1.

S. Galhotra et al., "Fairness Testing: Testing Software for Discrimination," Proceedings of the 11th Joint Meeting of the European Software Engineering Conference and the ACM SIGSOFT Symposium on Foundations of Software Engineering (ESEC/FSE), Sep. 4-8, 2017, pp. 498-510.

T.T. Moores et al., "Ethical Decision Making in Software Piracy: Initial Development and Test of a Four-Component Model," MIS Quarterly, Mar. 2006, pp. 167-180, vol. 30, No. 1.

G. Katz et al., "Reluplex: An Efficient SMT Solver for Verifying Deep Neural Networks," International Conference on Computer Aided Verification (CAV), Jul. 24, 2017, pp. 97-117.

P. Godefroid et al., "DART: Directed Automated Random Testing," Proceedings of the ACM SIGPLAN Conference on Programming Language Design and Implementation (PLDI), Jun. 12-15, 2005, pp. 213-223.

C.J. Bartlett et al., "Testing for Fairness with a Moderated Multiple Regression Strategy: An Alternative to Differential Analysis," Personnel Psychology, Jun. 1978, pp. 233-241, vol. 31, No. 2.

* cited by examiner

```
i=0
result = empty
q = empty // it's a priority queue
q.add (select_first_test_input());   // can be random selection, or if user provides
some data, clustering can be used to select a test case from a cluster
l: while(i<limit & !q.isEmpty()){
 t = deque(q);
check_for_error_condition(t) // this is application specific, and can be used for to
check if condition of individual discrimination is satisfied
decision_tree d = local_explainer(t,class);   // may be a portion of a decision tree,
such as one or more paths of the decision tree
 if previously generated decision_tree s entails d (this entailment is checked against
a constraint solver)
       then continue;
 for each subset s of branches b in decision_tree
       path_constraint = toggle(S,B) // in general this step utilizes a transformation,
and Boolean constraint toggle is one such transformation
       input= solve(path_constraint) // an off-the-shelf solver is utilized here
       q.add(input,b, Rank = max (average confidence of the toggled predicates,
predicate importance for application))
 i++;
}
if(i<limit)
 q.add(generate another seed test input) // random selection or selection from
another cluster
 goto l.
```

FIG. 3A check_for_error_condition(t) is application specific, and can check for individual discrimination:

```
class = execute(t)
for each t' in advar(t) //advar: changes protected attribute value
class1=execute(t');
if(class!=class1){
result.add((t,t'));
}
```

FIG. 3B

AUTOMATED TEST CASE GENERATION FOR DEEP NEURAL NETWORKS AND OTHER MODEL-BASED ARTIFICIAL INTELLIGENCE SYSTEMS

FIELD

The present invention relates to information technology, and, more particularly, to automated testing techniques.

BACKGROUND

A number of techniques are known for automated testing of model-based systems, such as deep neural networks (DNNs) and other types of systems used in machine learning or other artificial intelligence applications. In some techniques, a testing system does not have knowledge of the internal workings of the system under test, and the system under test is therefore considered a "black box." This is in contrast to so-called "white box" testing techniques, in which the testing system has knowledge of the internal workings of the system under test and utilizes that knowledge in determining an appropriate suite of test cases for testing the system under test. Conventional "black box" testing techniques are problematic in that it can be unduly difficult to determine if a given test suite provides adequate coverage of the various types of distinct behavior that may be exhibited by the system under test. This is particularly true of DNNs, which are generally considered "uninterpretable" systems. In these and other automated testing contexts, errors arising in the generation of certain test cases of a test suite can propagate to other test cases, leading to insufficient coverage of the system under test. Conventional techniques also often involve use of non-linear constraints that can be difficult to solve using available constraint solvers. Moreover, such techniques are typically not readily scalable to accommodate DNNs that include very large numbers of nodes, such as thousands of nodes.

SUMMARY

Embodiments of the invention provide improved techniques for automated testing of DNNs and other types of model-based systems used in machine learning or other artificial intelligence applications. For example, some embodiments provide "black box" testing techniques that can advantageously avoid propagation of errors from one test case to another when testing an uninterpretable system. Such techniques are illustratively configured to implement linear constraints that are relatively easy to solve using available constraint solvers, while also providing scalability to potentially very large numbers of nodes. Illustrative embodiments thereby provide substantial improvements in test coverage, accuracy, efficiency and performance relative to conventional techniques.

In one embodiment, an exemplary computer-implemented method comprises steps of selecting sample input data as a test case for a system under test, executing the test case on the system under test to obtain a result, and applying the result to a local explainer function to obtain at least a portion of a corresponding decision tree. The method further includes determining at least one path constraint from the decision tree, solving the path constraint to obtain a solution, and generating at least one other test case for the system under test based at least in part on the solution of the path constraint. The steps of the method are illustratively repeated in each of one or more additional iterations until at least one designated stopping criterion is met. The steps are carried out by at least one processing device comprising a processor coupled to a memory.

The resulting test cases in some embodiments form a test suite for accurate and efficient testing of a DNN or other type of uninterpretable system, in a manner that provides a desired level of test coverage.

A fairness check is illustratively performed on the test suite in some embodiments in order to ensure that it can adequately detect any situations in which discriminatory decisions may be made by the system under test.

Alternatively, fairness checking functionality may be integrated with test case generation, in a manner that automatically ensures that the generated test cases can detect individual and/or group discrimination or other types of bias in the system under test.

In another embodiment, an exemplary computer-implemented method comprises steps associated with a multiple-iteration process for automated generation of test cases for a system under test. A first iteration of the multiple-iteration process includes steps of: (i) generating at least a portion of a decision tree based at least in part on a result of execution of a test case on the system under test; and (ii) solving one or more path constraints of the decision tree to identify at least one additional test case. Each of one or more additional iterations of the multiple-iteration process repeats the generating step (i) and the solving step (ii) utilizing a different test case than that utilized for those steps in the first iteration. The steps are carried out by at least one processing device comprising a processor coupled to a memory.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 3A depicts software code for an algorithm utilized in automated test case generation for a DNN, according to an exemplary embodiment of the present invention.

FIG. 3B depicts software code for one possible implementation of an error condition check function incorporated into the FIG. 3A code to provide fairness checking, according to an exemplary embodiment of the present invention.

DETAILED DESCRIPTION

Illustrative embodiments of the invention are described herein in the context of illustrative methods, systems and devices for automated testing of DNNs and other types of systems used in machine learning or other artificial intelligence applications. However, it is to be understood that embodiments of the invention are not limited to the illustrative methods, systems and devices but instead are more broadly applicable to other suitable methods, systems and devices.

Figure 1:
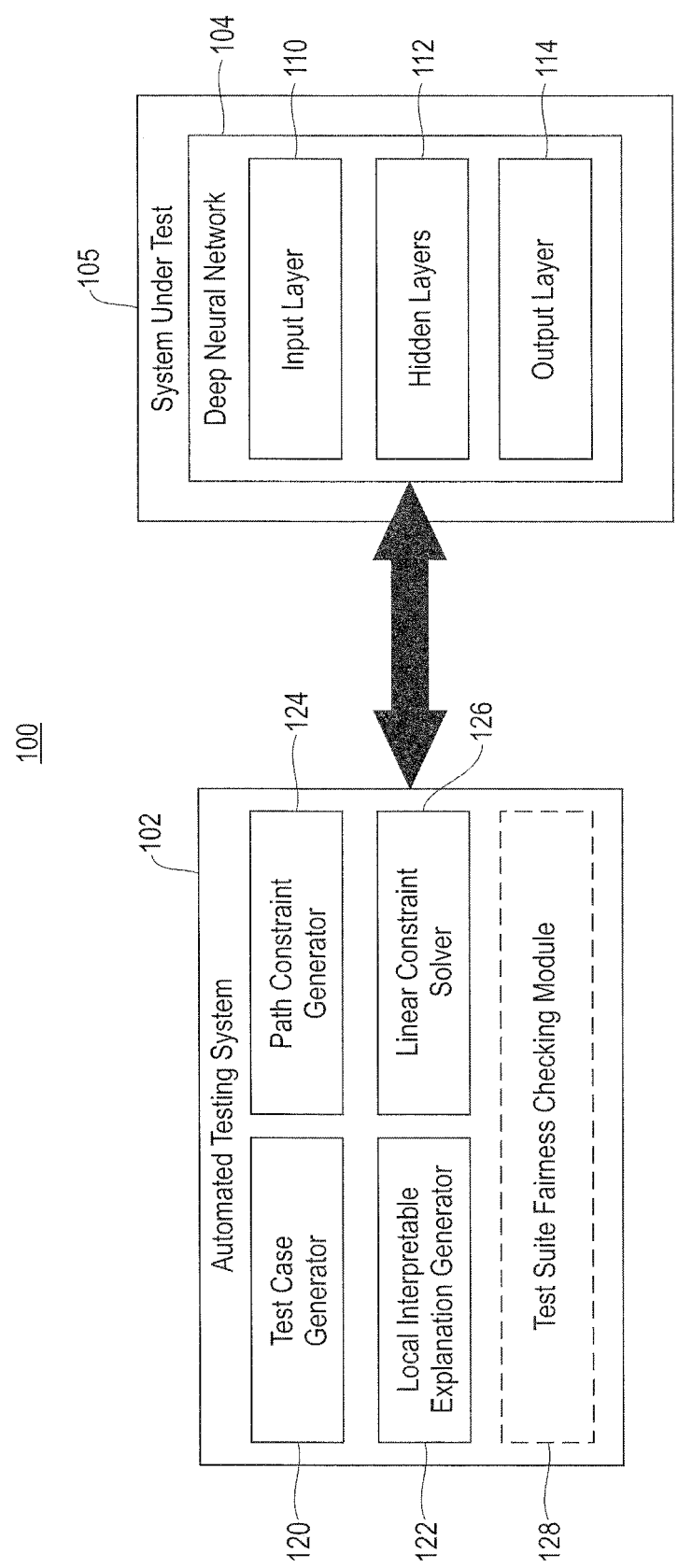
FIG. 1 depicts an information processing system comprising an automated testing system and a system under test that includes a DNN, according to an exemplary embodiment of the present invention.

FIG. 1 shows an information processing system 100 that includes an automated testing system 102 coupled to a DNN 104 that is part of a system under test 105. The system under test 105 in some embodiments includes additional components other than the DNN 104, or alternatively may include only the DNN 104. The term "system under test" as used herein is therefore intended to be broadly construed, and the DNN 104 alone may be considered a type of system under test. It is also possible in some embodiments that a model implemented by a DNN or other type of model-based artificial intelligence system, or a portion of such a model, can comprise a "system under test" as that term is broadly used herein.

The DNN 104 comprises an input layer 110, multiple hidden layers 112, and an output layer 114. The DNN 104 and the corresponding system under test 105 of which it is a part are examples of what are also referred to herein as "model-based systems" that are utilized in applications such as machine learning applications or other artificial intelligence applications. For example, the system under test 105 can comprise an automated dialog system or conversation system that utilizes DNN 104 to control dialog with system users. The system under test 105 can alternatively comprise a wide variety of other types of systems implementing machine learning or other types of artificial intelligence functionality based at least in part on DNNs or other types of deep learning or neural network models.

The automated testing system 102 is configured with functionality for automated testing of the DNN 104. The automated testing system 102 comprises a test case generator 120, a local interpretable explanation generator 122, a path constraint generator 124 and a linear constraint solver 126. Also included in the automated testing system 102 is a test suite fairness checking module 128. It is shown in dashed outline as it is considered an optional component of the FIG. 1 embodiment. Some embodiments disclosed herein incorporate fairness checking functionality while others do not. However, designation of any particular component as optional in one embodiment herein should not be interpreted as an indication that other components are required in that embodiment or other embodiments. Accordingly, other implementations of automated testing system 102 in other embodiments can include only a subset of the components 120, 122, 124 and 126, or can include additional or alternative components for use in automated testing of the DNN 104.

The automated testing system 102 and the system under test 105 are illustratively implemented using one or more processing platforms, each comprising at least one processing device that includes a processor coupled to a memory. For example, both the automated testing system 102 and the system under test 105 can be deployed on a single common processing platform. Alternatively, the automated testing system 102 and the system under test 105 can be deployed on separate processing platforms, possibly in different locations interconnected by one or more networks. It is also possible in some embodiments that multiple distinct processing platforms may be used to implement a given one of the automated testing system 102 and the system under test 105.

As noted above, conventional approaches to testing of DNNs are problematic. DNNs are generally "uninterpretable" and so it is difficult to know if a given test suite has covered sufficient behaviors of the model. Errors can propagate from certain test cases to other test cases, unduly limiting the coverage of the test suite. The conventional approaches fail to adequately address these and other coverage issues. In addition, such conventional approaches introduce non-linear conditions which can be difficult to solve, and are often not readily scalable to very large numbers of nodes, such as 1000 nodes or more.

The automated testing system 102 in the present embodiment advantageously overcomes these drawbacks of conventional approaches through automated generated of test cases using the components 120, 122, 124 and 126, possibly in combination with associated fairness checking provided using component 128.

For example, as will be described in more detail below, the automated testing system 102 is configured to provide "black box" testing techniques that can advantageously avoid propagation of errors from one test case to another when testing the DNN 104 or another type of uninterpretable system. Such techniques are illustratively configured to implement linear constraints that are relatively easy to solve using available constraint solvers, while also providing scalability to potentially very large numbers of nodes. The automated testing system 102 can therefore provide substantial improvements in test coverage, accuracy, efficiency and performance relative to conventional techniques.

In a test case generation mode of operation of the automated testing system 102, the test case generator 120 selects sample input data as a test case for the DNN 104 of the system under test 105, executes the test case on the DNN 104 to obtain a result, and applies the result to the local interpretable explanation generator 122 to obtain at least a portion of a corresponding decision tree. The local interpretable explanation generator 122 implements what is more generally referred to herein as a "local explainer function."

In some embodiments, the local explainer function is configured in accordance with a specified Local Interpretable Model-Agnostic Explanations (LIME) model, of the type described in M. T. Ribeiro et al., "Why Should I Trust You?" Explaining the Predictions of Any Classifier, KDD 2016, San Francisco, Calif., which is incorporated by reference herein. For example, the local explainer function can comprise an otherwise conventional LIME model suitably modified to return at least a portion of a decision tree.

LIME is a tool for providing human-interpretable explanations for a model (e.g., a machine learning or other type of "black box" model). LIME is useful for providing an ability to explain what a particular model is doing, such as by providing links between features of an input that explain why a particular output is achieved. LIME therefore explains why a decision took place using human-interpretable terms. For example, LIME can explain a classifier in terms of interpretable representations (e.g., words), even if that is not the representation actually used by the classifier. As disclosed herein, LIME can be modified to provide as its output a decision tree or portions of a decision tree.

The local explainer function implemented by the local interpretable explanation generator 122 can also be configured to return other types of information, such as confidence associated with a particular word in the case of text data or designated important pixels in the case of image data. The obtained portion of the decision tree in some embodiments can comprise a complete decision tree.

The decision tree illustratively provides a semantic-level dynamic representation of a plurality of paths of the DNN 104. The decision tree is characterized by linear path constraints that are solvable by the linear constraint solver 126.

The path constraint generator 124 of the automated testing system 102 determines at least one path constraint from the decision tree, and the linear constraint solver 126 solves the path constraint. At least one other test case is then generated by the test case generator 120 for the DNN 104 based at least in part on the solution of the path constraint.

The above-described operations are illustratively repeated by the automated testing system 102 in each of one or more additional iterations until at least one designated stopping criterion is met. Different ones of the iterations can utilize respective different selected sample input data. The designated stopping criterion illustratively comprises an iteration counter reaching a specified maximum value.

The resulting test cases in some embodiments form a test suite for accurate and efficient testing of the DNN 104, in a manner that provides a desired level of test coverage. A fairness check is illustratively performed on the test suite using the test suite fairness checking module 128 in order to ensure that the test suite can adequately detect any situations in which discriminatory decisions may be made by the DNN 104, as will be described in more detail below. In some embodiments, at least portions of the fairness checking functionality are incorporated into the test case generator 120. In arrangements of this type, fairness checks are performed as the test cases are being generated, in order to ensure that the resulting test suite includes test cases that provide desired levels of fairness and non-discrimination.

The automated testing system 102 is also configured to support one or more additional modes of operation. For example, in a testing mode of operation, test cases that collectively comprise a test suite generated in the above-described test case generation mode of operation are utilized to test the DNN 104. It is also possible that the automated testing system 102 can include entirely separate systems for test case generation and actual testing using the generated test cases. Accordingly, the system that generates the test cases can be separate from the system that performs the testing on DNN 104 using those test cases.

In some embodiments, determining at least one path constraint from the decision tree in the path constraint generator 124 comprises determining multiple path constraints for respective distinct subsets of branches of the decision tree. Solving the path constraint for the decision tree in such an arrangement more particularly comprises solving multiple path constraints in the linear constraint solver 126. Also, generating at least one other test case more particularly comprises generating multiple test cases based at least in part on respective solutions of respective ones of the path constraints.

As will be described in more detail below, determining at least one path constraint from the decision tree illustratively comprises determining the path constraint utilizing symbolic execution based at least in part on a toggle function.

Symbolic execution generally involves assigning symbolic values to respective inputs of the DNN 104, and generating constraints in terms of those symbols for the possible outcomes of each conditional branch. The accumulated constraints of a given path can be solved by a constraint solver in order to provide a corresponding input value or set of input values that will produce the corresponding output.

The toggle function may be implemented as a logical NOT operation. In such an arrangement, given a particular constraint X>2, toggle (X>2)=NOT (X>2)=X<2. Thus, application of the toggling function produces a different constraint. Other types of functions can be used to implement such constraint toggling in conjunction with symbolic execution in other embodiments.

In some embodiments, the determination of path constraints from a decision tree in path constraint generator 124 comprises determining the path constraint subject to one or more user-specified constraints.

Additionally or alternatively, this determination can involve identifying a particular path constraint from the decision tree, determining if the particular path constraint is already covered by one or more existing test cases, and identifying another path constraint from the decision tree responsive to an affirmative determination that the particular path constraint is already covered by one or more existing test cases.

The selected sample input data provide an initial "seed" for a given iteration of the automated test case generation process. The selection of sample input data by the test case generator 120 in some embodiments utilizes clustering functionality. For example, selecting sample input data for a given iteration of a multiple-iteration automated test case generation process can comprise obtaining input data, clustering the input data into multiple clusters, selecting a particular one of the clusters, and selecting the sample input data from the selected one of the clusters. The selection operations can comprise random selection.

The automated testing system 102 in generating test cases for testing of the DNN 104 implements a "black box" approach that systematically explores the decision space of the DNN 104. It utilizes local explanations provided by the local interpretable explanation generator 122 to determine the decision space of the DNN 104 for a given test case and uses this information to generate additional test cases through dynamic symbolic execution. The automated testing system 102 in some embodiments receives as its inputs the particular model implemented by the DNN 104, a feature domain for the particular model, one or more test case generation criteria, and possibly one or more user-defined coverage criteria, and generates as its output a set of test cases satisfying the specified criteria.

The particular operations of the automated testing system 102 as described above are presented by way of illustrative example only, and additional or alternative operations can be used in other embodiments.

For example, in some embodiments the automated testing system 102 via its components 120, 122, 124, 126 and 128 is configured to implement a multiple-iteration process for automated generation of test cases for the DNN 104. A first iteration of the multiple-iteration process includes generating at least a portion of a decision tree based at least in part on a result of execution of a test case on the system under test, and solving one or more path constraints of the decision tree to identify at least one additional test case. Each of one or more additional iterations of the multiple-iteration process repeats the generating step and the solving step utilizing a different test case than that utilized for those steps in the first iteration.

Also, the particular components shown within automated testing system 102 are exemplary only, and the associated functionality may be implemented in different arrangements of components, or in a single component, in other embodiments.

The operation of the automated testing system 102 in illustrative embodiments will now be described in more detail with reference to the flow diagrams of FIGS. 2 and 4 and the software code of FIGS. 3A and 3B.

Figure 2:
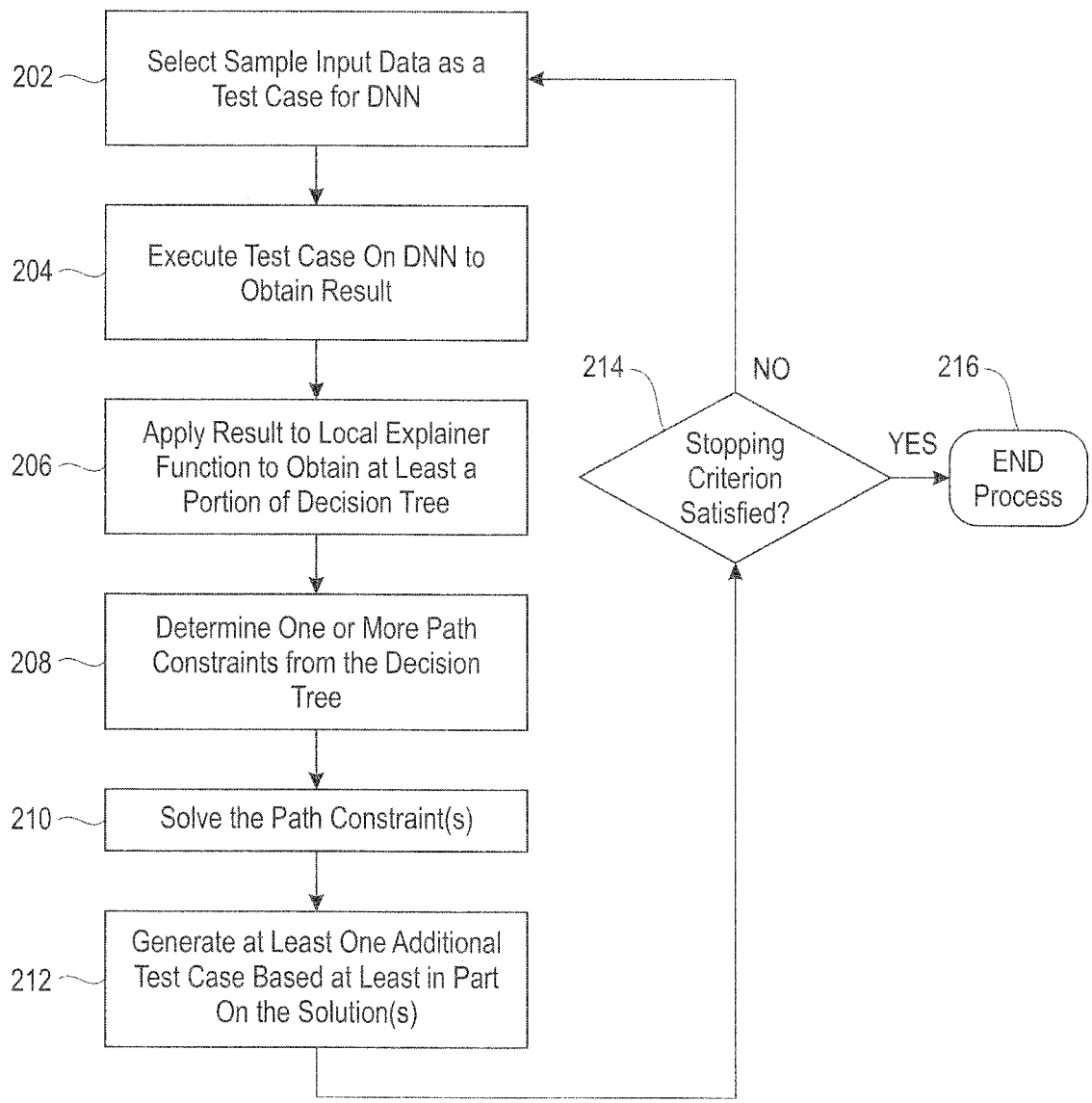
FIG. 2 depicts a process for automated test case generation for a DNN, according to an exemplary embodiment of the present invention.

Referring initially to FIG. 2, a process 200 for automated test case generation for a DNN such as DNN 104 includes steps 202 through 216 as shown, which are assumed to be performed by cooperative interaction of the components 120, 122, 124, 126 and 128 of the automated testing system 102.

In step 202, sample input data are selected as a test case for the DNN. For example, sample input data can be randomly selected (e.g., random selection of a particular row from a matrix of test data) in a manner that covers all features of interest. Clustering can be used, in which case the input data are clustered, a particular cluster is selected, and the sample input data are selected from the selected cluster.

In step 204, the test case is executed on the DNN to obtain a result.

In step 206, the result is applied to a local explainer function to obtain at least a portion of a corresponding decision tree. The decision tree provides a semantic-level dynamic representation of a plurality of paths of the DNN, and is characterized by linear path constraints that are solvable by a linear constraint solver. This approach therefore avoids the problems of conventional techniques involving use of non-linear constraints that can be difficult to solve using available constraint solvers.

In step 208, one or more path constraints are determined from the decision tree. The determination of path constraints illustratively involves performing symbolic execution on the decision tree or portions thereof based at least in part on a toggle function. As noted above, the toggle function illustratively comprises a logical NOT operation, although other types of toggle functions can be used. The determination of the path constraint from the decision tree can also be implemented subject to one or more user-specified constraints. For example, one or more constraints relating to use case (e.g., a particular use case of adversarial input generation) can be included. Additionally or alternatively, conditions for the path constraint can be selected based at least in part on one or more coverage criteria. The determination of path constraints also involves determining if a given path constraint is already covered by existing test cases. As the present embodiment utilizes decision tree based approximation, care should be taken to ensure that path constraints are not duplicated.

In step 210, the one or more path constraints are solved using a linear solver to generate one or more respective solutions. The linear solver makes use of feature domain knowledge in solving a given path constraint.

In step 212, at least one additional test case is generated based at least in part on the one or more solutions.

In step 214, a decision is made as to whether or not a designated stopping criterion has been satisfied. For example, as noted above, a stopping criterion in some embodiments is satisfied when the multiple-iteration automated test case generation process reaches a maximum number of iterations. If the stopping criterion is satisfied, the process moves to step 216 and ends as indicated, and otherwise returns to step 202 to generate additional test cases in one or more additional iterations each utilizing different selected input data. Multiple stopping criteria may be used in other embodiments.

The particular process operations illustrated in FIG. 2 are examples only, and other embodiments can use different types and arrangements of process operations in automated generation of test cases over multiple iterations.

FIG. 3A shows example software code for an algorithm utilized in automated test case generation for a DNN, and represents one possible implementation of the FIG. 2 process. In this embodiment, the check_for_error_condition function is application specific, and illustratively provides a type of fairness check functionality within the test case generation process. For example, the check_for_error_condition function can be used to check whether or not a condition of individual discrimination is satisfied for particular designated protected attributes such as race or gender.

FIG. 3B shows example software code for one possible implementation of the check_for_error_condition function that is incorporated into the FIG. 3A software code to provide fairness checking.

The software code of FIGS. 3A and 3B is illustratively stored in a memory of the automated testing system 102 and executed by a processor of the automated testing system 102 in order to implement at least portions of the components 120, 122, 124, 126 and 128. Such components are therefore at least partially software based in illustrative embodiments. These components in the present embodiment implement fairness checking functionality in generating the test cases for the system under test.

In other embodiments, fairness checking functionality can be implemented in a bias checker configured to check for individual and/or group discrimination within a DNN or other model-based artificial intelligence system.

It is therefore to be appreciated that fairness checking functionality can be implemented separately from an automated test case generation process. An example of such an arrangement is shown in the flow diagram of FIG. 4, which illustrates a process 400 for fairness checking of a test suite of an automated testing system such as automated testing system 102. The process 400 comprises steps 402 through 408 as shown, which are assumed to be performed by cooperative interaction of the components 120, 122, 124, 126 and 128 of the automated testing system 102.

In step 402, test cases are generated for a test suite, possibly using the process 200 of FIG. 2 as previously described.

In step 404, a fairness check is applied to a current version of the test suite.

In step 406, a decision is made as to whether or not a threshold adequacy score has been achieved. If the threshold adequacy score has been achieved, the process moves to step 408 and ends there as indicated, and otherwise returns to step 402 to generate additional test cases for the test suite.

Figure 4:
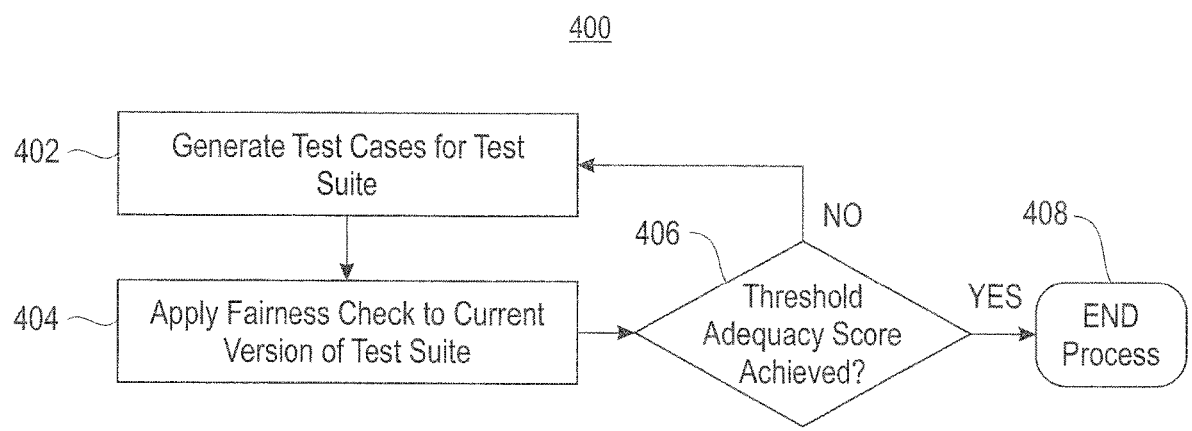
FIG. 4 depicts a process for fairness checking of a test suite of an automated testing system, according to an exemplary embodiment of the present invention.

As in the FIG. 2 embodiment, the particular process operations illustrated in FIG. 4 are examples only, and other embodiments can use different types and arrangements of process operations in fairness checking of a test suite.

The fairness checking in some embodiments encompasses group discrimination (e.g., a hiring decision should be fair with respect to race, or a loan decision should be fair with respect to gender) and/or individual discrimination (e.g., different decisions should not be reached for two individuals having different race/gender but otherwise the same attributes). The attributes of race and gender in these examples are "protected attributes." As mentioned previously, the software code of FIGS. 3A and 3B collectively provides test case generation in a manner that prevents individual discrimination for protected attributes.

Although illustrated above for the case of an uninterpretable system such as DNN 104, fairness checking functionality in other embodiments can be implemented for other types of systems, including interpretable systems.

In a given implementation of the test suite fairness checking module 128 of automated testing system 102, the input may comprise the model for the DNN 104, a test suite comprising one or more test cases, input schema, and protected attributes. The output illustratively comprises an adequacy score for the test suite, and possibly additional test cases generated in the manner previously described.

Conventional fairness checking approaches are problematic in that such approaches generally cannot check the fairness adequacy of existing test suites, cannot create fairness test suites with desired levels of fairness coverage, and cannot generate test cases which are based on data or control dependency which does not exist in the system under test. These and other problems with conventional fairness checking approaches are addressed and overcome by illustrative embodiments disclosed herein.

For example, illustrative embodiments disclosed herein implement fairness checking functionality by utilizing indirect symbolic execution which exhaustively considers features corresponding to protected attributes so as to provide a proper explanation for individual discrimination. In some embodiments, this involves modifying an otherwise conventional global explanation such as that conventionally provided by the TREPAN algorithm to translate the system into a decision tree. The TREPAN algorithm is described in M. W. Craven et al., "Extracting Tree-Structured Representations of Trained Networks," Advances in Neural Information Processing Systems, Vol. 8, pp. 24-30, 1996, which is incorporated by reference herein. More particularly, in some fairness checking embodiments disclosed herein, the TREPAN algorithm is illustratively modified to translate an entire DNN into a decision tree, with randomization in the algorithm being modified to exhaustively pick protected attribute features so that proper explanation for individual discrimination is provided.

It should be noted that data and control dependency can be present in a given set of data through various types of statistical correlations. For example, in a given set of data, age and height may be correlated up to age 21 and thereafter age and salary may be correlated. Such correlations can be inferred by performing data correlation analysis, but may not be explicitly present in the DNN or other system under test. Existing data correlation analysis is generally unable to find such dependencies, but illustrative embodiments can identify these dependencies utilizing piece-wise correlation.

Consider by way of example a situation where a developer unaware of the training data writes the code of an interpretable model. There may be two different paths in the code branching out of a constraint which are non-discriminatory as far as the code is concerned. However, discrimination may be detected after considering the correlated constraints uncovered from the training data while evaluating these two paths.

The above-noted TREPAN algorithm implements random selection for generating a decision tree from a neural network model. However, illustrative embodiments disclosed herein modify that algorithm to first pick instances of the protected attributes. As a result, the corresponding explanation of bias is exhaustively covered in the decision tree generated from the neural network model. For uninterpretable models, corresponding interpretable models can be inferred by using global explanations generated by the TREPAN algorithm. Accuracy of the inferred interpretable model depends highly on the accuracy of the TREPAN algorithm. Uncovering correlation between constraints by analyzing training data can thus help to reduce the inherent error in such inferred interpretable models.

Assume as a further example that symbolic execution generates a symbolic expression on input for a path, such as $(age>1) \land (height>1) \land (out==5)$, where $\land$ denotes the logical AND operator. The symbolic expression is utilized to generate test input, such as $(age=/\land height=2)$. The conditionals are systematically toggled to generate other input, such as $(age>1 \land height<=1)$: age=2, height=1 for the other path. The systematic exploration is done on branching conditions which have an explicit relationship with the input. In this example, an algorithm for an interpretable system can generate an indirect constraint using data analysis, such as the indirect constraint $(((age<21) \land (age=c1.height+d)) \lor ((age>21) \land (age=c2.salary+d)))$, where $\lor$ denotes the logical OR operator. A path expression can then be generated in accordance with the symbolic execution previously described.

This is an example of what is also referred to herein as explanation-based symbolic execution performed in conjunction with fairness checking. The absence of a protected variable from the explanation signifies that the path is not dependent on the protected variable, and will therefore return the same result regardless of the value of the protected variable. The presence of protected variables in multiple local explanations can indicate that the corresponding paths are near decision boundaries and could produce discriminatory results.

The above-described fairness checking functionality can be implemented in the test suite fairness checking module 128 of automated testing system 102, and possibly one or more of the other components 120, 122, 124 and 126. Alternatively, such fairness checking functionality can be implemented independently of test case generation, and can be applied, for example, to implement fairness testing of one or more existing test suites for bias or other types of individual or group discrimination. Test case generation and fairness checking aspects of the present invention are therefore considered independent of one another, although they can be combined in some embodiments.

Illustrative embodiments provide a number of advantages relative to conventional techniques.

For example, some embodiments provide improved techniques for automated testing of DNNs and other types of model-based systems used in machine learning or other artificial intelligence applications. These embodiments provide "black box" testing techniques that can advantageously avoid propagation of errors from one test case to another when testing an uninterpretable system. Such techniques are illustratively configured to implement linear constraints that are relatively easy to solve using available constraint solvers, while also providing scalability to potentially very large numbers of nodes. Illustrative embodiments thereby provide substantial improvements in test coverage, accuracy, efficiency and performance relative to conventional techniques.

The "black box" testing techniques in illustrative embodiments are agnostic to the particular model implemented in a system under test, and are therefore widely applicable to a broad range of systems.

Some embodiments do not impose any significant restrictions on the sample input data used to "seed" a test case generation process.

Illustrative embodiments implement test case generating utilizing a decision tree provided at least in part by a local explainer function. The decision tree provides a local explanation as to why a particular input yields a particular output. Such local explanations provide simplified predicates and exhibit linear constraints. Extraction of local explanations in combination with toggling of constraints allows for efficient systematic exploration of the full decision space of a given model implemented in a system under test.

Fairness checking in illustrative embodiments is implemented separately or in conjunction with test case generation in order to ensure that a given test suite can reliably determine if a system under test is non-discriminatory and free of other forms of bias.

Such embodiments illustratively utilize explanation-based symbolic execution, possibly based on a modified TREPAN algorithm, to provide improved fairness checking for both interpretable and uninterpretable systems.

The particular advantages referred to above and elsewhere herein are present in illustrative embodiments, but need not be present in other embodiments. Accordingly, such advantages should not be construed as restrictions or limitations of the present invention.

Embodiments of the present invention include a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
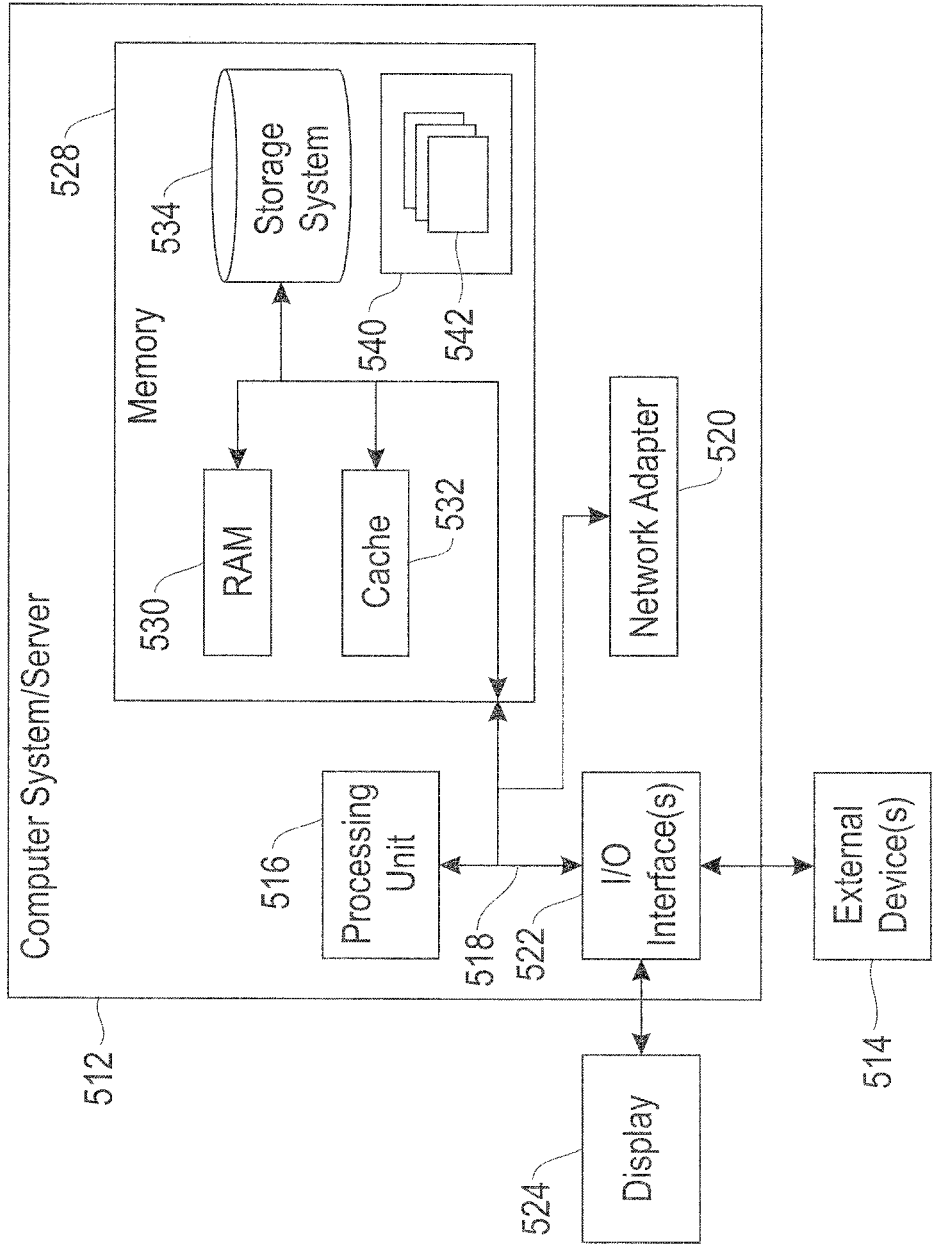
FIG. 5 depicts a computer system in accordance with which one or more components/steps of techniques of the invention may be implemented, according to an exemplary embodiment of the invention.

One or more embodiments can make use of software running on a general-purpose computer or workstation. With reference to FIG. 5, in a computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, mobile and wearable devices, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

The bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 512 typically includes a variety of computer system readable media. Such media may be any available media that is accessible by computer system/server 512, and it includes both volatile and non-volatile media, removable and non-removable media.

The system memory 528 can include computer system readable media in the form of volatile memory, such as random access memory (RAM) 530 and/or cache memory 532. The computer system/server 512 may further include other removable/non-removable, volatile/nonvolatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 518 by one or more data media interfaces. As depicted and described herein, the memory 528 may include at least one program product having a set (e.g., at least one) of program modules that are configured to carry out the functions of embodiments of the invention. A program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc., one or more devices that enable a user to interact with computer system/server 512, and/or any devices (e.g., network card, modem, etc.) that enable computer system/server 512 to communicate with one or more other computing devices. Such communication can occur via I/O interfaces 522. Still yet, computer system/server 512 can communicate with one or more networks such as a LAN, a general WAN, and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
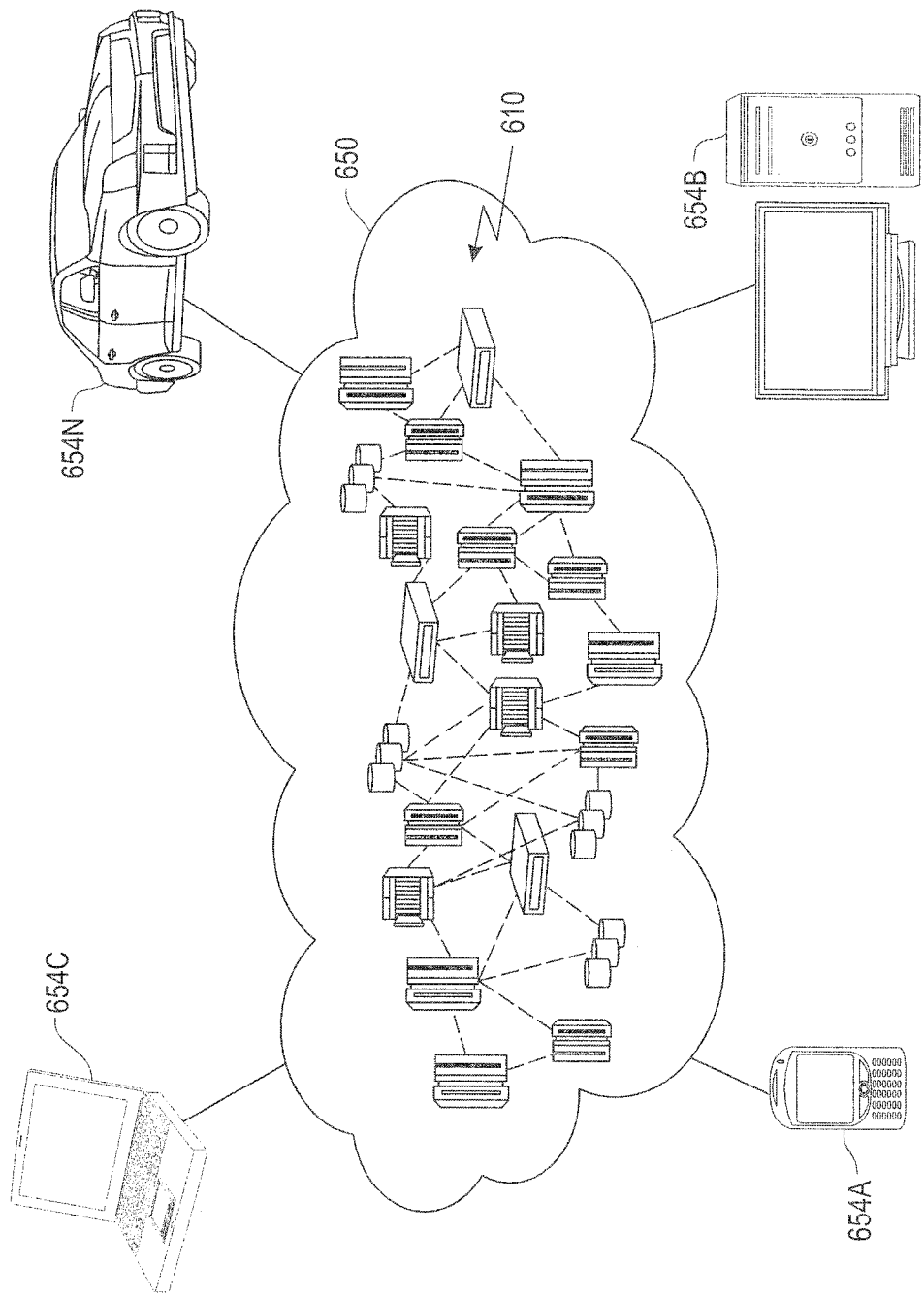
FIG. 6 depicts a cloud computing environment, according to an exemplary embodiment of the present invention.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
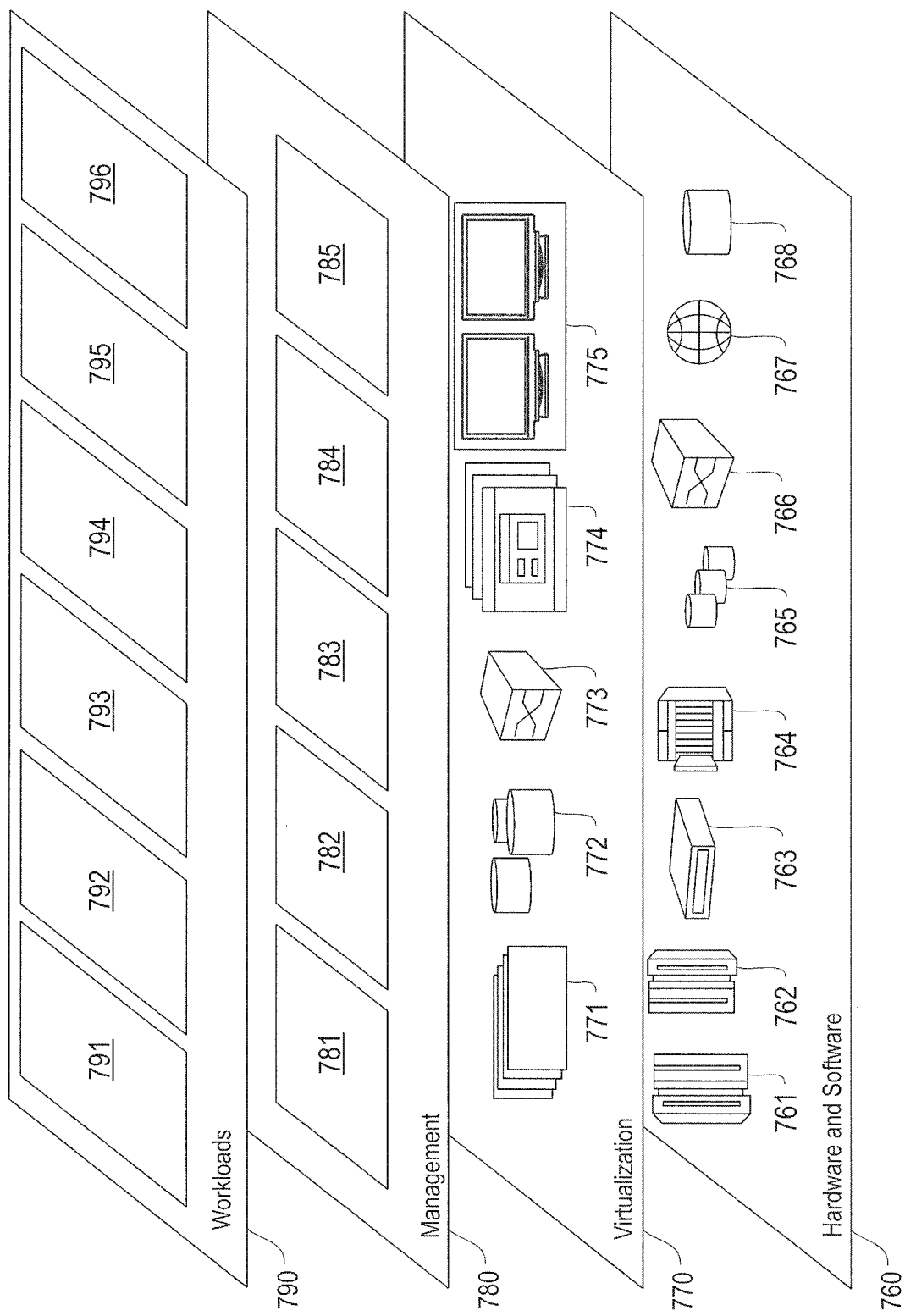
FIG. 7 depicts abstraction model layers, according to an exemplary embodiment of the present invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and automated dialog system training processing 796, which may perform various functions described above with respect to resource demand prediction and forecasting techniques described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating one or more test cases for a system under test containing a multitude of nodes, comprising:
    selecting sample input data as a test case for a system under test, wherein the system under test comprises at least one deep neural network (DNN) comprising (i) an input layer, (ii) one or more hidden layers and (iii) an output layer;
    executing the test case on the system under test to obtain a result;
    applying the result to a local explainer function to obtain at least a portion of a corresponding decision tree, wherein the decision tree provides a semantic-level dynamic representation of a plurality of paths of the system under test;
    determining at least one path constraint from the decision tree;
    solving the path constraint to obtain a solution; and
    generating at least one other test case for the system under test based at least in part on the solution of the path constraint;
    wherein the method is carried out by at least one processing device comprising a processor coupled to a memory.

2. The computer-implemented method of claim 1, wherein the local explainer function is configured in accordance with a specified Local Interpretable Model-Agnostic Explanations (LIME) model.

3. The computer-implemented method of claim 1, wherein the steps are repeated in each of one or more additional iterations until at least one designated stopping criterion is met.

4. The computer-implemented method of claim 3, wherein different ones of the iterations utilize respective different selected sample input data.

5. The computer-implemented method of claim 3, wherein the designated stopping criterion comprises an iteration counter reaching a specified maximum value.

6. The computer-implemented method of claim 1, wherein said determining at least one path constraint from the decision tree comprises determining multiple path constraints for respective distinct subsets of branches of the decision tree.

7. The computer-implemented method of claim 6, wherein said solving the path constraint comprises solving the multiple path constraints and generating at least one other test case comprises generating multiple test cases based at least in part on respective solutions of respective ones of the path constraints.

8. The computer-implemented method of claim 1, wherein said determining at least one path constraint from the decision tree comprises determining the path constraint utilizing symbolic execution based at least in part on a toggle function.

9. The computer-implemented method of claim 1, wherein said determining at least one path constraint from the decision tree comprises determining the path constraint subject to one or more user-specified constraints.

10. The computer-implemented method of claim 1, wherein said determining at least one path constraint from the decision tree comprises:
    identifying a particular path constraint from the decision tree;
    determining if the particular path constraint is already covered by one or more existing test cases; and
    identifying another path constraint from the decision tree, responsive to an affirmative determination that the particular path constraint is already covered by one or more existing test cases.

11. The computer-implemented method of claim 1, wherein the decision tree is characterized by linear path constraints that are solvable by a linear constraint solver.

12. The computer-implemented method of claim 1, wherein said selecting sample input data comprises:
    obtaining input data;
    clustering the input data into multiple clusters;
    selecting a particular one of the clusters; and
    selecting the sample input data from the selected one of the clusters.

13. The computer-implemented method of claim 1, comprising:
    configuring a test suite to include the test cases; and
    performing a fairness check on the test suite.

14. A computer program product for generating one or more test cases for a system under test containing a multitude of nodes, the computer program product comprising a computer readable storage medium having program instructions embodied therewith, the program instructions executable by at least one computing device to cause the at least one computing device to perform steps of:

selecting sample input data as a test case for a system under test, wherein the system under test comprises at least one deep neural network (DNN) comprising (i) an input layer, (ii) one or more hidden layers and (iii) an output layer;

executing the test case on the system under test to obtain a result;

applying the result to a local explainer function to obtain at least a portion of a corresponding decision tree, wherein the decision tree provides a semantic-level dynamic representation of a plurality of paths of the system under test;

determining at least one path constraint from the decision tree;

solving the path constraint to obtain a solution; and generating at least one other test case for the system under test based at least in part on the solution of the path constraint.

15. The computer program product of claim 14, wherein the steps are repeated in each of one or more additional iterations until at least one designated stopping criterion is met.

16. A system for generating one or more test cases for a system under test containing a multitude of nodes comprising:

a memory; and at least one processor coupled to the memory and configured for:

selecting sample input data as a test case for a system under test, wherein the system under test comprises at least one deep neural network (DNN) comprising (i) an input layer, (ii) one or more hidden layers and (iii) an output layer;

executing the test case on the system under test to obtain a result;

applying the result to a local explainer function to obtain at least a portion of a corresponding decision tree, wherein the decision tree provides a semantic-level dynamic representation of a plurality of paths of the system under test;

determining at least one path constraint from the decision tree;

solving the path constraint to obtain a solution; and generating at least one other test case for the system under test based at least in part on the solution of the path constraint.

17. The system of claim 16, wherein said determining at least one path constraint from the decision tree comprises determining multiple path constraints for respective distinct subsets of branches of the decision tree.

18. A computer-implemented method for generating test cases for a system under test containing a multitude of nodes, comprising steps of:

in a first iteration of a multiple-iteration process for automated generation of test cases for a system under test:

(i) generating at least a portion of a decision tree based at least in part on a result of execution of a test case on the system under test, wherein the system under test comprises at least one deep neural network (DNN) comprising (i) an input layer, (ii) one or more hidden layers and (iii) an output layer, and wherein the decision tree provides a semantic-level dynamic representation of a plurality of paths of the system under test; and (ii) solving one or more path constraints of the decision tree to identify at least one additional test case; and in each of one or more additional iterations of the multiple-iteration process for automated generation of test cases for a system under test, repeating the generating step (i) and the solving step (ii) utilizing a different test case than that utilized for those steps in the first iteration;

wherein the steps are carried out by at least one processing device comprising a processor coupled to a memory.

* * * * *